United States Patent
Mansur et al.

(10) Patent No.: US 12,242,881 B2
(45) Date of Patent: *Mar. 4, 2025

(54) INTELLIGENT CONNECTION PLACEMENTS ON SR-IOV VIRTUAL FUNCTIONS

(71) Applicant: International Business Machines Corporation, Armonk, NY (US)

(72) Inventors: Vishal Mansur, Bangalore (IN); Sivakumar Krishnasamy, Bangalore (IN); Niranjan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,474

(22) Filed: Oct. 5, 2023

(65) Prior Publication Data
US 2024/0028383 A1 Jan. 25, 2024

Related U.S. Application Data

(63) Continuation of application No. 16/990,216, filed on Aug. 11, 2020, now Pat. No. 11,809,889.

(51) Int. Cl.
*G06F 9/455* (2018.01)
*H04L 45/24* (2022.01)
*H04L 49/00* (2022.01)
*H04L 61/103* (2022.01)

(52) U.S. Cl.
CPC .......... *G06F 9/45558* (2013.01); *G06F 9/455* (2013.01); *H04L 61/103* (2013.01); *G06F 2009/45595* (2013.01); *H04L 45/245* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 2013/0339955 A1 | 12/2013 | Prawer et al. | |
| 2016/0077884 A1 | 3/2016 | Hunter et al. | |
| 2016/0350151 A1 | 12/2016 | Zou et al. | |
| 2022/0050698 A1 | 2/2022 | Mansur | |

OTHER PUBLICATIONS

"DeviceTree", Device Tree, current release v0.2, accessed Feb. 13, 2020, 4 pages, <https://www.devicetree.org/>.
"Efficient VM-to-VM Communication with QLogic NIC Partitioning", Qlogic a Cavium company, Technology Brief, SN0430941-00 Rev. C 2/17, 4 pages.
IBM Appendix P, "List of patent and patent applications treated as related", Filed Herewith, 2 pages.

*Primary Examiner* — Qing Yuan Wu
(74) *Attorney, Agent, or Firm* — Michael O'Keefe

(57) ABSTRACT

In an approach to intelligent connection placement across multiple logical ports, a mapping table for a virtual machine is created. Responsive to determining that an entry exists in the mapping table for the port on the peer device, whether a virtual function exists the port on the peer device in the mapping table for the same physical function is determined. A virtual function is selected from the mapping table to connect the local port to the port on the peer device.

17 Claims, 7 Drawing Sheets

INTELLIGENT CONNECTION PLACEMENTS ON SR-IOV VIRTUAL FUNCTIONS

BACKGROUND

The present invention relates generally to the field of bus-related hardware virtualization, and more particularly to intelligent connection placement across multiple logical ports.

In computer networking, the term link aggregation applies to various methods of combining multiple network connections in parallel in order to provide throughput greater than a single connection could sustain, and to provide redundancy in case one of the links should fail. A link aggregation group (LAG) combines a number of physical ports together to make a single high-bandwidth data path, so as to implement the traffic load sharing among the member ports in the group and to enhance the connection reliability. The physical ports in the LAG look, to the system, like a single port.

EtherChannel is a port link aggregation technology that allows grouping of several physical Ethernet links to create one logical channel to provide high-speed, fault-tolerant communications between switches, routers and servers. An EtherChannel can be created using between two and eight active Fast, Gigabit, or 10-Gigabit Ethernet ports, with an additional one to eight inactive (failover) ports which become active as an active ports fail.

Input/output (I/O) virtualization is a methodology to simplify management, lower costs and improve performance of servers, typically in enterprise environments. I/O virtualization is created by abstracting the upper layer network protocols from the actual physical connections. I/O virtualization technology enables one physical network port to appear as multiple virtual network interface ports. Virtual ports function as conventional ports, and are designed to be compatible with existing operating systems, hypervisors, and applications. Virtual ports appear as normal physical ports to networking resources such as local area networks and wide area networks.

In virtualization, single root input/output virtualization (SR-IOV) is a specification that allows a device, such as a network adapter, to separate access to its resources among various Peripheral Component Interconnect (PCI) express (PCIe) hardware functions. The SR-IOV allows different virtual machines in a virtual environment to share a single PCIe hardware interface. The SR-IOV offers different virtual functions to different virtual components (e.g., a network adapter) on a physical server. These functions consist of a Physical Function (PF), and one or more Virtual Functions (VFs). The PF is the primary function of the device and advertises the SR-IOV capabilities of the device. Each VF is associated with a PF of the device. A VF shares one or more physical resources of the device, such as a memory and a network port, with the PF and other VFs on the device. Each VF is associated with a hypervisor child partition in a virtualized environment.

SUMMARY

Embodiments of the present invention disclose a method, a computer program product, and a system for intelligent connection placement across multiple logical ports. In one embodiment, a mapping table for a virtual machine is created. Responsive to determining that an entry exists in the mapping table for the port on the peer device, whether a virtual function exists the port on the peer device in the mapping table for the same physical function is determined. A virtual function is selected from the mapping table to connect the local port to the port on the peer device.

DETAILED DESCRIPTION

Figure 1:
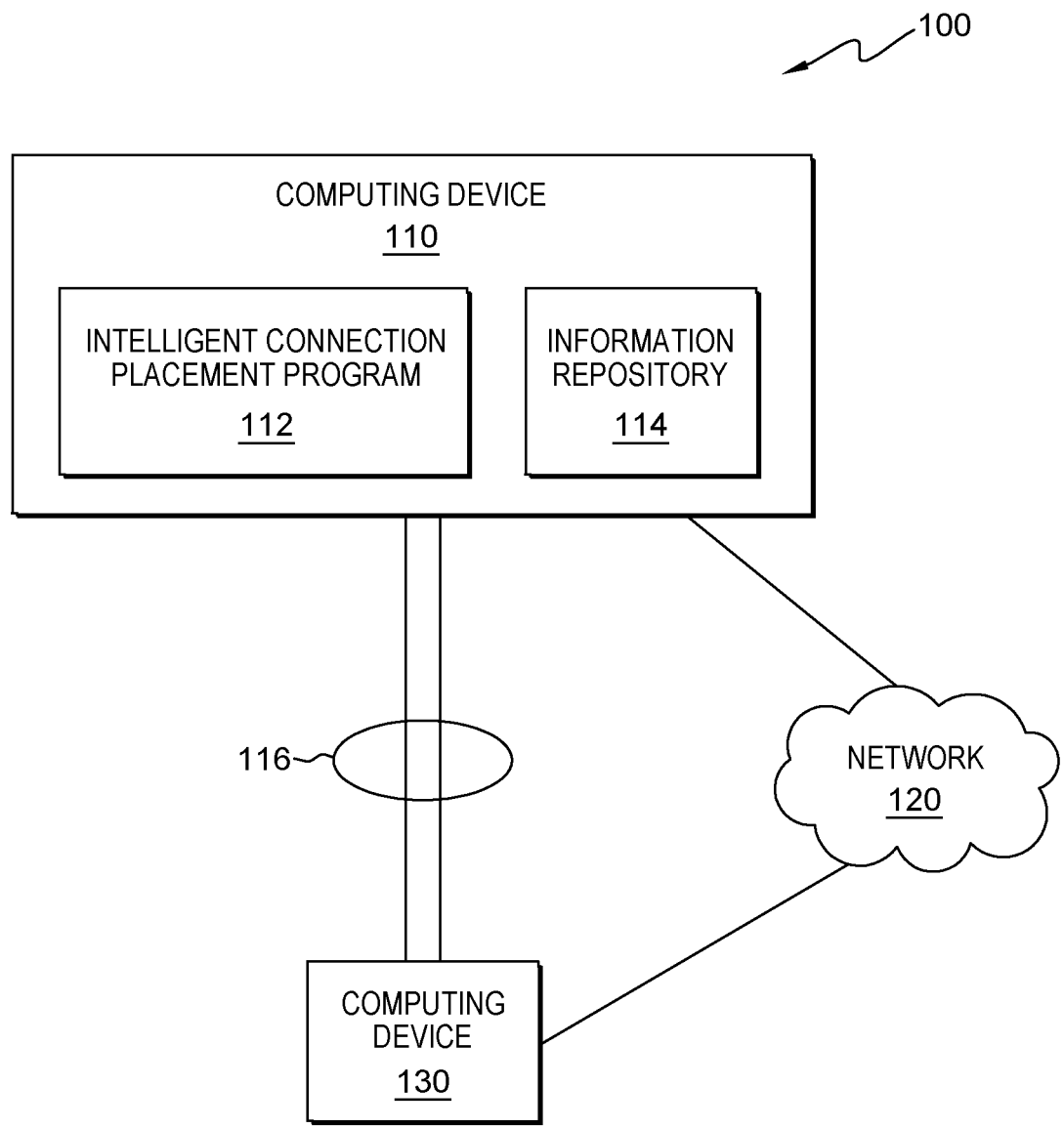
FIG. 1 is a functional block diagram illustrating a distributed data processing environment, in accordance with an embodiment of the present invention.

In a port link aggregation virtualization, each PF and VF is assigned a unique identification that allows an I/O memory management unit to differentiate between different traffic streams and apply memory and interrupt translations between the PF and VFs. This allows traffic streams to be delivered directly to the appropriate hypervisor parent or child partition. As a result, nonprivileged data flows from the PF to a VF without affecting the other VFs.

I/O virtualized adapters such as SR-IOV support multiple logical ports per physical port. Each of these VFs can be assigned individually to separate virtual machines. VFs are hardware resources that can be directly programmed by a native device driver running on the virtual machine. Hardware on the adapter implements a Layer 2 switch which determines if packets sent on a VF need to be looped back for communication between two virtual machines on the same system or sent out on the physical port for communication to a destination outside the system.

SR-IOV enables network traffic to bypass the software switch layer of the hypervisor virtualization stack. Because the VF is assigned to a child partition, the network traffic flows directly between the VF and child partition.

Existing connection placement agents such as EtherChannel do not consider the physical layout of underlying adapters when applying their selection logic. For instance, under EtherChannel if there are multiple adapters for link aggregation, the selection logic is based on connection information such as connection tuples, i.e., source, destination, IP address, port number, or protocol, or could be based on mac addresses. This is acceptable for dedicated adapters, because they are given equal weigh since all connections are handled alike. In the case of hardware virtualized adapters such as SR-IOV, however, that selection logic may not result in equal handling since it depends upon the physical layout of the adapters and not the logical layout of the VFs. If the connection endpoints happen to be on the same system, then performance in terms of latency is better between logical ports under same physical port than between physical ports, since it avoids an addition hop of the external physical switch to connect the physical ports.

Embodiments of the present invention attempt to improve the connection placement selection logic to include the physical layout of the SR-IOV adapter in consideration with the normal physical parameters to ensure the best available path is chosen between the two end points, whether an internal path between VFs, or an external path over the network.

As a usage example, in a 3-tier core banking application architecture, application servers communicate to a database server over virtual functions sharing the same SR-IOV physical port. In addition, asynchronous network backups from database servers to remote disaster recovery locations continuously synchronize the systems with the disaster recovery database. The database server has multiple adapter ports configured with link aggregation to support a high bandwidth connection for the network traffic. In the existing art, these connections will use any link of a LAG, whether internal or external, impacting performance. Embodiments of the present invention, however, identify the connections across the application and database servers sharing the same SR-IOV physical port in a LAG and assigns the connections to the appropriate SR-IOV VFs in the LAG, avoiding the external connection when an internal VF connection exists.

Embodiments of the present invention identify if the endpoints of a desired connection are on the same server and, if so, identifies if SR-IOV VFs are available between the two endpoints. Embodiments of the present invention include a method to determine if the two VFs on the endpoints of a connection belong to the same physical port and, if so, to feed this information back to the connection placement algorithm in the LAG to perform optimal load balancing.

In addition to load balancing, embodiments of the present invention can also be used to perform selective link failover. Currently, when a link failure happens on a physical port, the LAG fails over all connections running on that link to any other link which is configured as either a backup for the link or part of the LAG. In embodiments of the present invention, however, the LAG has the intelligence to identify which connections belong to logical ports under the same physical link, and a selective failover can be performed to move only the connections that will be impacted by the physical port link outage, especially for port failures at the switch end. Since the present invention will bypass the external ports, using a virtual switch to connect the VFs internally, none of the connections under logical ports of the same physical port are impacted by the physical port outage at the switch end.

The physical port to which a virtual function belongs is identified by parsing a data structure typically called the device tree. The device tree is created when the platform firmware on the system performs the standard PCI bus configuration. The hardware devices are then communicated to the operating system via the device tree. Each operating system has access to this device tree which contains all the required details of the devices assigned to the virtual machine. For SR-IOV adapters, in addition to details required to identify the device, the device tree has details of the logical port in addition to the physical port. By querying the device tree, operating system can determine which physical port the assigned VF belongs to.

In order to determine if the remote end of a TCP connection is connected to a virtual function in the same SR-IOV physical port as the host connection, the MAC address of the peer is used to query the MAC address lookup table of the SR-IOV adapter via a hypervisor call. With this query the operating system can determine which SR-IOV physical port the MAC address belongs to. For example, in FIG. 2 vSWITCH1 206 and vSWITCH2 208 each have two virtual functions per physical port (PF0 for vSWITCH1 and PF1 for vSWITCH2). In order to determine if the remote end of a TCP connection is connected to a virtual function in the same SR-IOV physical port as the host connection, the MAC address of the peer can be obtained from the Address Resolution Protocol (ARP) table or, if no entry found, an ARP lookup can be performed. With the MAC address determined for the remote end of the connection, the system is able to compare the MAC address with the mapping of the SR-IOV logical ports to physical ports to determine if the remote end of the TCP connection is connected to a virtual function on the same physical port.

Figure 3:
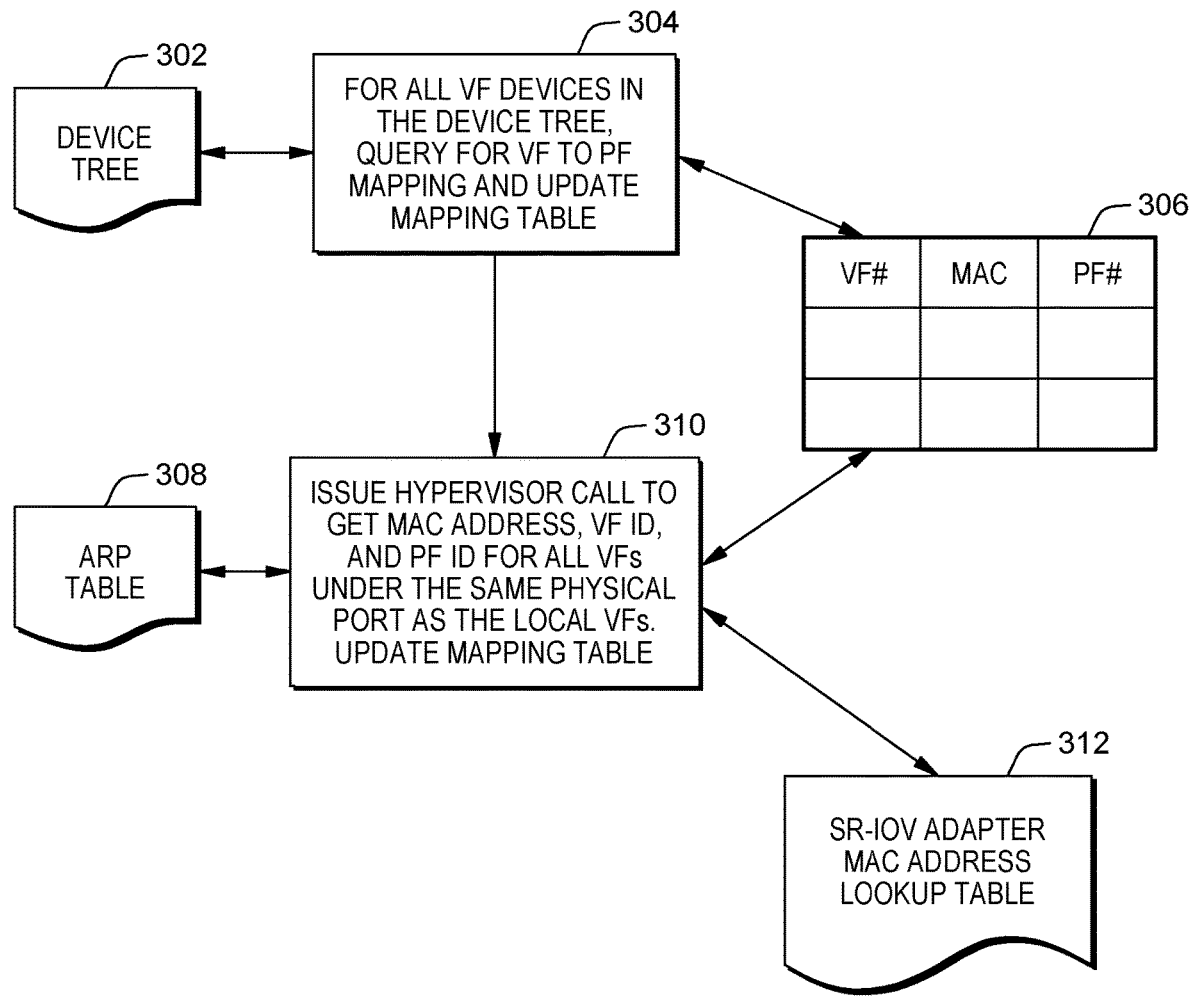
FIG. 3 illustrates an example of a method to populate the mapping tables with logical port to physical port mappings, in accordance with an embodiment of the present invention.
Figure 4:
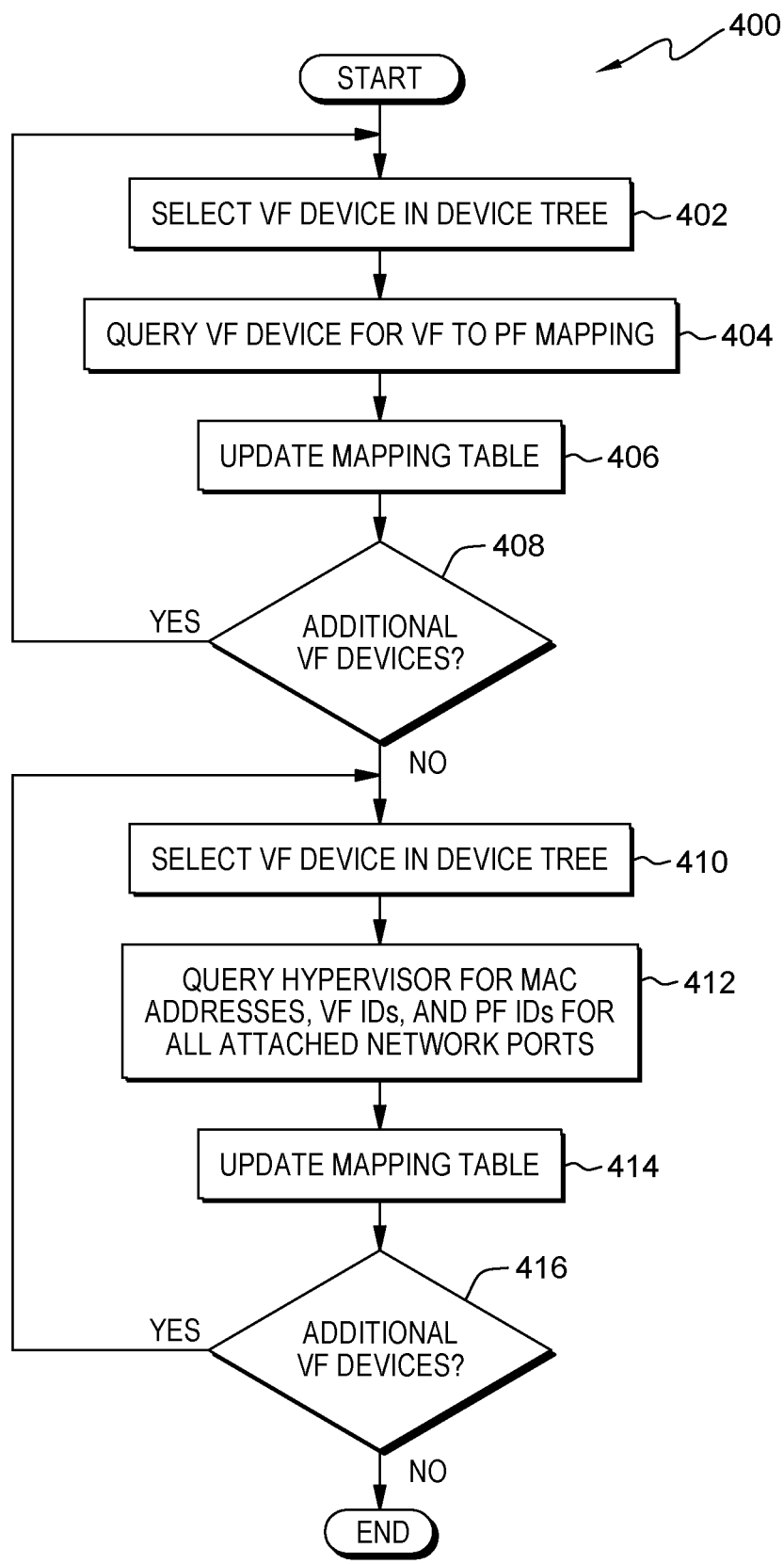
FIG. 4 is a flowchart depicting operational steps of the intelligent connection placement program to establish the mapping table, on a computing device within the distributed data processing environment of FIG. 1, in accordance with an embodiment of the present invention.
Figure 5:
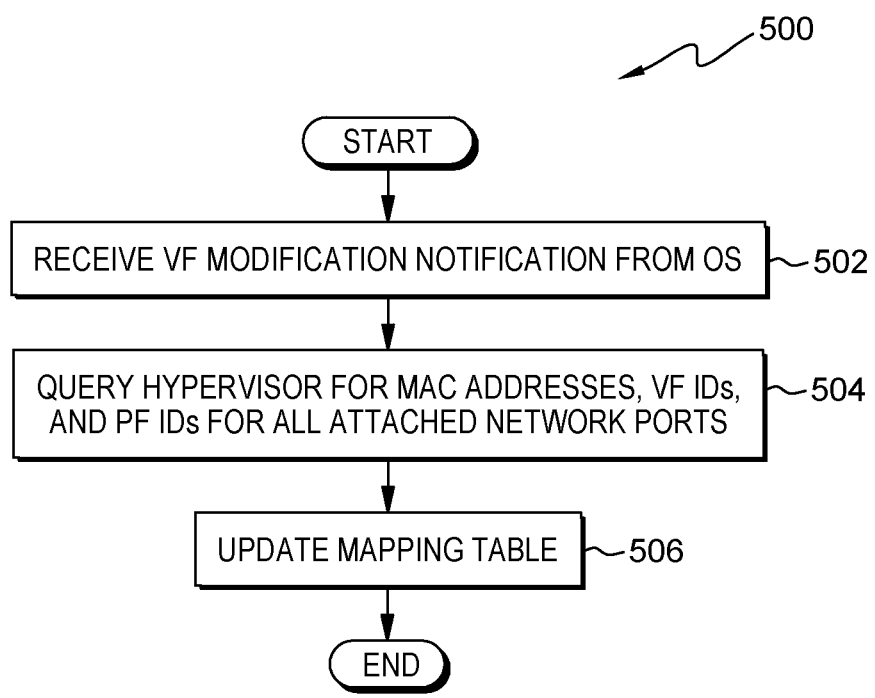
FIG. 5 is a flowchart depicting operational steps of the intelligent connection placement program to maintain the mapping table, on a computing device within the distributed data processing environment of FIG. 1, in accordance with an embodiment of the present invention.

The algorithm for constructing the mapping table is shown in FIG. 3, and the flow diagram for constructing the mapping table is shown in FIG. 4 and described below. The flow diagram for updating the mapping table once it has been constructed is shown in FIG. 5 and described below.

FIG. 1 is a functional block diagram illustrating a distributed data processing environment, generally designated 100, suitable for operation of intelligent connection placement program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and computing device 130 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, computing device 130, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes intelligent connection placement program 112. In an embodiment, intelligent connection placement program 112 is a program, application, or subprogram of a larger program for intelligent connection placement across multiple logical ports. In an alternative embodiment, intelligent connection placement program 112 may be located on any other device accessible by computing device 110 via network 120.

In an embodiment, computing device 110 includes information repository 114. In an embodiment, information repository 114 may be managed by intelligent connection placement program 112. In an alternate embodiment, information repository 114 may be managed by the operating system of the device, alone, or together with, intelligent connection placement program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, system configuration data, virtual machine configuration data, PCI configuration data, SR-IOV configuration data, TCP data, and other data that is received by intelligent connection placement program 112 from one or more sources, and data that is created by intelligent connection placement program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Distributed data processing environment 100 includes computing device 130. Computing device 130 can be a standalone computing device, a storage device, a management server, a mobile computing device, or any other electronic device or computing system capable of receiving, sending, and processing data, and capable of communicating with other computing devices (not shown) within distributed data processing environment 100 via network 120. In another embodiment, computing device 130 can represent a server computing system utilizing multiple computers as a server system, such as in a cloud computing environment. In yet another embodiment, computing device 130 represents a computing system utilizing clustered computers and components (e.g., database server computers, application server computers) that act as a single pool of seamless resources when accessed within distributed data processing environment 100.

Distributed data processing environment 100 includes LAG 116. In an embodiment, LAG 116 is an EtherChannel link aggregation group. In another embodiment, LAG 116 may be a link aggregation group supporting any other aggregation technology as would be known to a person in the art.

Figure 2:
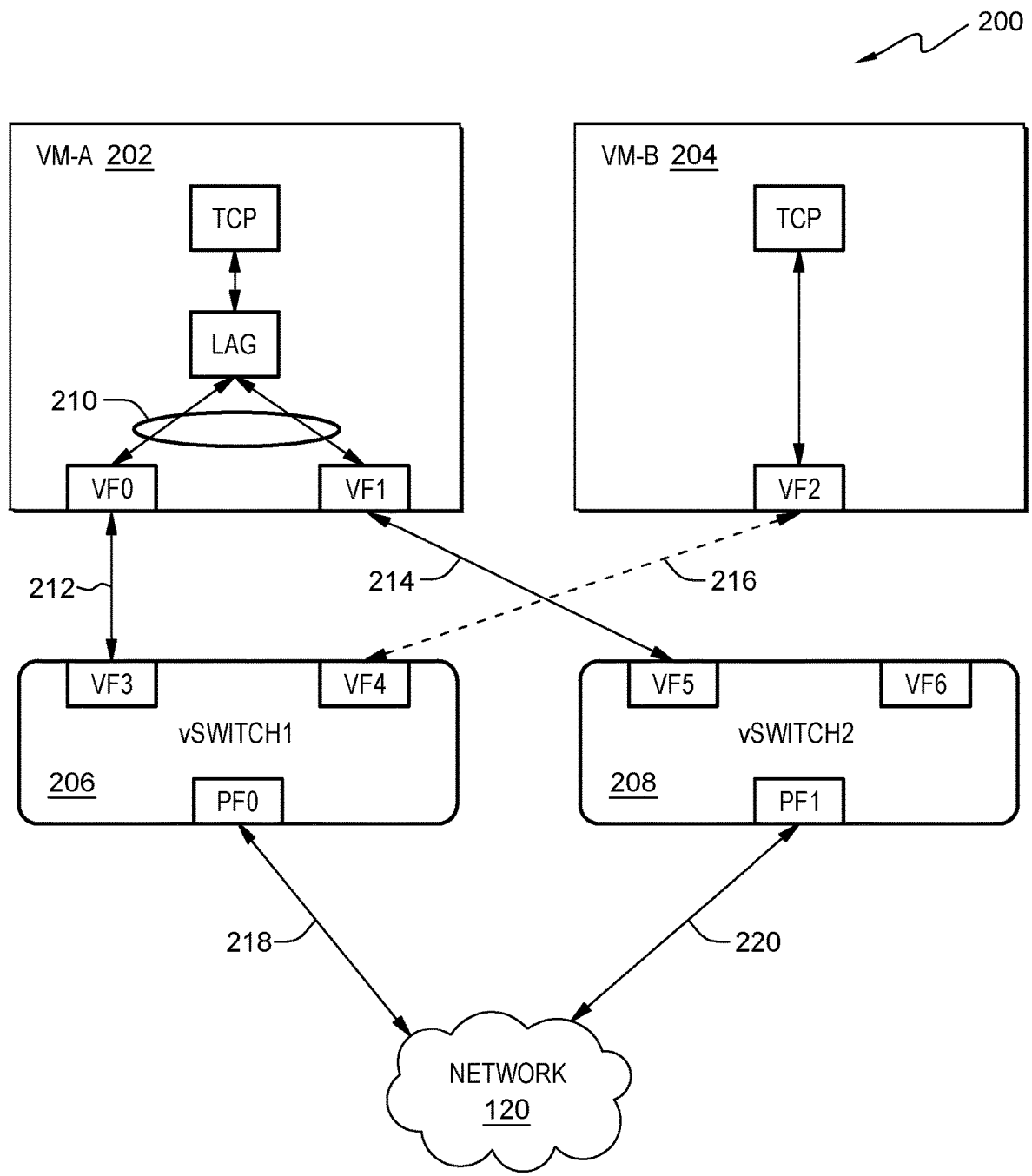
FIG. 2 illustrates an example of a system using SR-IOV virtualization and network LAG groups, in accordance with an embodiment of the present invention.

FIG. 2 is an example that illustrates a typical virtual I/O channel of a virtual machine, generally designated 200, in accordance with an embodiment of the invention.

Virtual I/O channel 200 includes virtual machine VM-A 202, which includes virtual functions VF0 and VF1. VF0 and VF1 are part of LAG 210, which connects the two virtual functions to the TCP port of VM-A. Virtual I/O channel 200 also includes virtual machine VM-B 204, which includes virtual function VF2. VF2 connects the virtual function to the TCP port of VM-B. vSWITCH1 206 and vSWITCH2 208 are virtual switches within virtual I/O channel 200. vSWITCH1 206 contains virtual functions VF3 and VF4, and connects them to physical port PF0. vSWITCH2 208 contains virtual functions VF5 and VF6, and connects them to physical port PF1. Virtual I/O channel 200 connects to network 120 (from FIG. 1) via network connections 218 and 220.

In this example, the TCP port in VM-A 202 connects to both VF0 and VF1 via LAG 210. VF0 is connected to VF3 of vSWITCH1 206 via connection 212. VF1 is connected to VF5 of vSWITCH2 208 via connection 214. The TCP port in VM-B 204 connects to VF2, and VF2 is connected to VF4 of vSWITCH1 206 via connection 216. If VM-A 202 needs to make a TCP connection to VM-B 204, in the present art a connection will be randomly chosen by LAG 210 to either VF0 or VF1. But if LAG 210 connects the TCP port of VM-A 202 to VF1, then the only path to the TCP port of VM-B is through network 120, since VF1 only connects to VF5, which is on vSWITCH2 208. In embodiments of the present invention, since the system has full knowledge of the mapping of virtual ports to physical ports via the mapping table, LAG 210 is aware that the TCP port of VM-B 204 is connected to VF4 of vSWITCH1 206 via connection 216. LAG 210, therefore, will assign the connection to VF0, thereby making the connection to VM-B internally within vSWITCH1 206 from VF3 to VF4, eliminating the need for an external connection via network 120. This reduces the overall latency of the connection, and, since the internal throughput of vSWITCH1 206 is likely higher than the throughput of network 120, will improve performance as well.

FIG. 3 is an example of an algorithm for building the mapping table in an embodiment of the invention. FIG. 3 includes device tree 302, procedures 304 and 310, mapping table 306, ARP table 308, and SR-IOV adapter MAC address lookup table 312. Device tree 302, as described previously, is created by the system during initialization. Procedures 304 and 310 are the basic algorithm for creating and updating mapping table 306, and are described in more detail in the description of FIG. 4 below. ARP table 308 is a standard table to store the IP addresses and MAC addresses of the network devices attached to the system. SR-IOV adapter MAC address lookup table 312 is a table created by the SR-IOV driver that contains the MAC addresses of the ports controlled by the SR-IOV driver.

The algorithm in FIG. 3 is typically performed at the initial system bootup to initialize the table, or whenever a new VF is added to the system. Once the table is populated for the local VFs, a query is performed to the hypervisor that manages the physical port to obtain a list of all MAC addresses under this physical port. This information is then maintained in the local mapping table. The operating system can also register a call back handler with the hypervisor to be notified when a new VF is added or when VF assignments are modified. The callback handler can then reissue hypervisor calls to keep the mapping table updated.

FIG. 4 is a flow chart diagram of workflow 400 depicting operational steps for intelligent connection placement program 112 to establish and maintain the mapping table for intelligent connection placement across multiple logical ports. In an alternative embodiment, the steps of workflow 400 may be performed by any other program while working with intelligent connection placement program 112. In an embodiment, intelligent connection placement program 112 selects a VF device in the device tree. In an embodiment, intelligent connection placement program 112 queries the VF device for VF to PF mapping. In an embodiment, intelligent connection placement program 112 updates the mapping table. In an embodiment, intelligent connection placement program 112 determines if there are additional VF devices. In an embodiment, if intelligent connection placement program 112 determines there are additional VF devices, then intelligent connection placement program 112 selects the next VF device in the device tree. In an embodiment, intelligent connection placement program 112 queries the hypervisor for MAC addresses, VF IDs, and PF IDs for all attached network ports. In an embodiment, intelligent connection placement program 112 updates the mapping table. In an embodiment, intelligent connection placement program 112 determines if there are additional VF devices in the device tree.

It should be appreciated that embodiments of the present invention provide at least for intelligent connection placement across multiple logical ports. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Intelligent connection placement program 112 selects a VF device in the device tree (step 402). In an embodiment, intelligent connection placement program 112 selects a VF device from the device tree that was created earlier during system configuration, as described above.

Intelligent connection placement program 112 queries the VF device for VF to PF mapping (step 404). In an embodiment, intelligent connection placement program 112 queries the VF device to determine the physical port that the VF is mapped to. Intelligent connection placement program 112 will use this mapping to update the mapping table in the next step.

Intelligent connection placement program 112 updates the mapping table (step 406). In an embodiment, intelligent connection placement program 112 uses the physical port mapping obtained in the previous step to update the mapping table for this VF, by creating an entry in the table with the number of the VF and the number of the physical port to which it is connected.

Intelligent connection placement program 112 determines if there are additional VF devices (decision block 408). In an embodiment, if intelligent connection placement program 112 determines there are additional VF devices that have not yet been mapped to physical ports ("yes" branch, decision block 408), then intelligent connection placement program 112 returns to step 402 to select the next VF device. If intelligent connection placement program 112 determines there are no additional VF devices ("no" branch, decision block 408), then intelligent connection placement program 112 proceeds to step 402 to query for the devices at the remote end of the virtual connection.

Intelligent connection placement program 112 selects the next VF device in the device tree (step 410). In an embodiment, intelligent connection placement program 112 selects the next VF device in the device tree to determine the PF to which the VF device is connected.

Intelligent connection placement program 112 queries the hypervisor for MAC addresses, VF IDs, and PF IDs for all attached network ports (step 412). In an embodiment, intelligent connection placement program 112 queries the hypervisor to determine all the connections for the VF, including VF IDs and PF IDs for all attached network ports. Intelligent connection placement program 112 uses this information to update the mapping table in the next step.

Intelligent connection placement program 112 updates the mapping table (step 414). In an embodiment, intelligent connection placement program 112 uses the VF ID and PF ID information obtained in the previous step to update the mapping table. In the first part of this flow diagram, intelligent connection placement program 112 updated the mapping table with the information for the local VF functions in the virtual machine. Here, intelligent connection placement program 112 updates the table with the information for the ports the local VF functions are connected to, thereby completing the mapping of virtual connections. This allows intelligent connection placement program 112 to make intelligent choices when making connections to utilize internal virtual ports and avoid external physical ports whenever an internal connection is possible.

Intelligent connection placement program 112 determines is there are additional VF devices in the device tree (decision block 416). In an embodiment, if intelligent connection placement program 112 determines there are additional VF devices in the device tree ("yes" branch, decision block 416), then intelligent connection placement program 112 returns to step 410. If intelligent connection placement program 112 determines there are no additional VF devices in the device tree ("no" branch, decision block 416), then intelligent connection placement program 112 terminates for this cycle.

FIG. 5 is a flow chart diagram of workflow 500 depicting operational steps for intelligent connection placement program 112 to maintain the mapping table for intelligent connection placement across multiple logical ports. In an alternative embodiment, the steps of workflow 500 may be performed by any other program while working with intelligent connection placement program 112. In an embodiment, intelligent connection placement program 112 receives a notification from the operating system that one or more new VFs have been added to the system, or one or more current VFs have been modified. In an embodiment, intelligent connection placement program 112 queries the hypervisor for MAC addresses, VF IDs, and PF IDs for all attached network ports. In an embodiment, intelligent connection placement program 112 updates the mapping table.

It should be appreciated that embodiments of the present invention provide at least for intelligent connection placement across multiple logical ports. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 5 illustrates one possible iteration of intelligent connection placement program 112, which repeats each time the mapping tree needs to be updated by intelligent connection placement program 112.

Intelligent connection placement program 112 receives a VF modification notification from the OS (step 502). In an embodiment, intelligent connection placement program 112 receives a notification from the operating system that one or more new VFs have been added to the system, or one or more current VFs have been modified. In an embodiment, intelligent connection placement program 112 registers a call back handler with the hypervisor to notify intelligent connection placement program 112 whenever new VFs are added to the system, or when VF assignments are modified. This allows intelligent connection placement program 112 to keep the mapping table current.

Intelligent connection placement program 112 queries the hypervisor for MAC addresses, VF IDs, and PF IDs for all attached network ports (step 504). In an embodiment, intelligent connection placement program 112 queries the hypervisor to determine all the connections for the VF, including VF IDs and PF IDs for all attached network ports. Intelligent connection placement program 112 uses this information to update the mapping table in the next step.

Intelligent connection placement program 112 updates the mapping table (step 506). In an embodiment, intelligent connection placement program 112 uses the VF ID and PF ID information obtained in the previous step to update the mapping table. In the first part of this flow diagram, intelligent connection placement program 112 updated the mapping table with the information for the local VF functions in the virtual machine. Here, intelligent connection placement program 112 updates the table with the information for the ports the local VF functions are connected to, thereby completing the mapping of virtual connections. This allows intelligent connection placement program 112 to make intelligent choices when making connections to utilize internal virtual ports and avoid external physical ports whenever an internal connection is possible.

Figure 6:
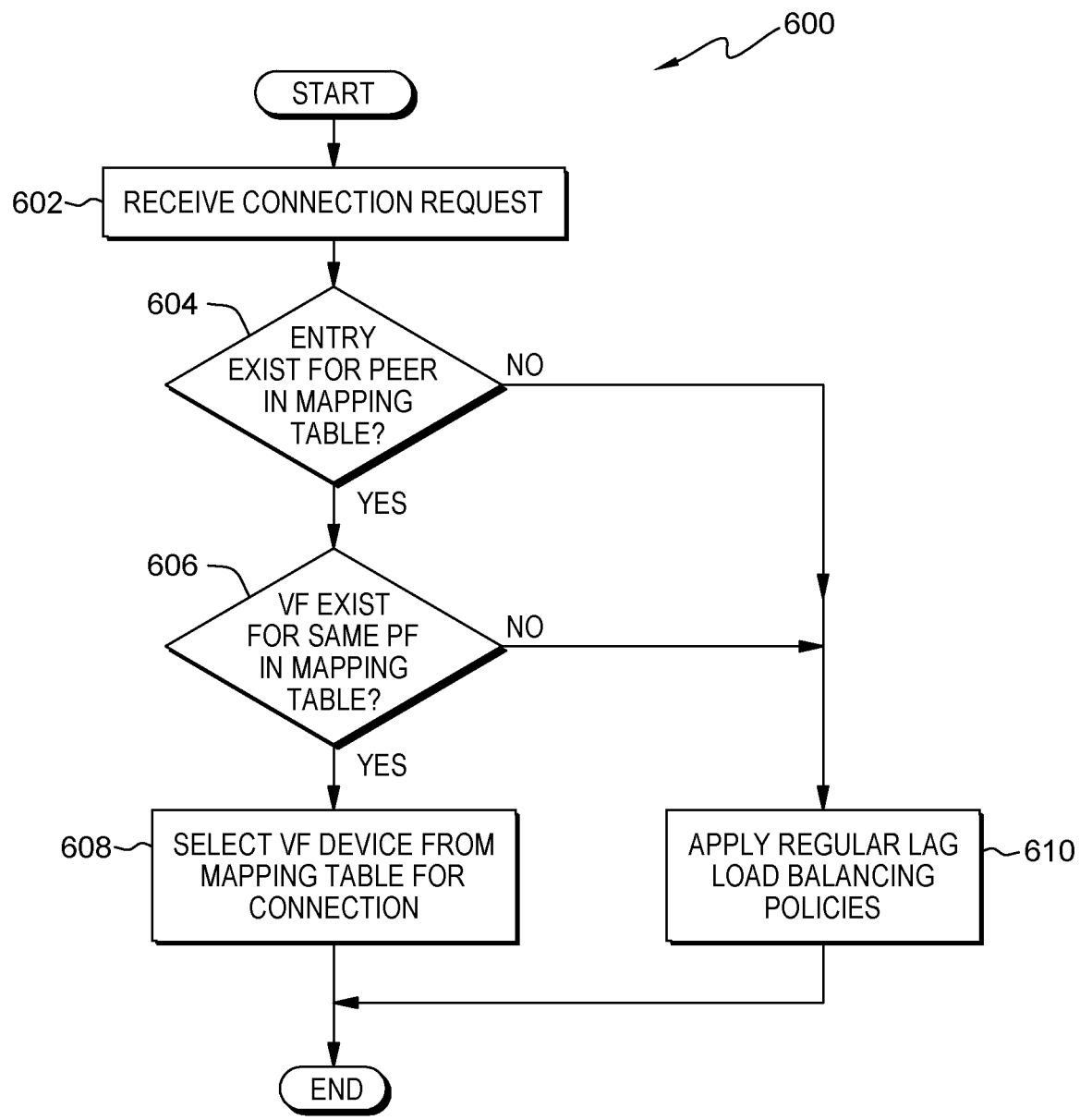
FIG. 6 is a flowchart depicting operational steps of the intelligent connection placement program to determine the connection placement across multiple logical ports, on a computing device within the distributed data processing environment of FIG. 1, in accordance with an embodiment of the present invention.

FIG. 6 is a flow chart diagram of workflow 600 depicting operational steps for intelligent connection placement program 112 for intelligent connection placement across multiple logical ports. In an alternative embodiment, the steps of workflow 600 may be performed by any other program while working with intelligent connection placement program 112. In an embodiment, intelligent connection placement program 112 receives a connection request. In an embodiment, intelligent connection placement program 112 determines if an entry exists for the peer in the mapping table. In an embodiment, intelligent connection placement program 112 determines if a VF exists for the same PF in the mapping table. In an embodiment, if intelligent connection placement program 112 determines that a VF exists for the same PF in the mapping table, then intelligent connection placement program 112 selects the VF device from the mapping table for the connection. In an embodiment, if intelligent connection placement program 112 determines that a VF does not exist for the same PF in the mapping table, then intelligent connection placement program 112 applies regular LAG load balancing policies to the connection.

It should be appreciated that embodiments of the present invention provide at least for intelligent connection placement across multiple logical ports. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 is illustrates one possible iteration of intelligent connection placement program 112, which repeats for each connection request received by intelligent connection placement program 112.

Intelligent connection placement program 112 receives a connection request (step 602). In an embodiment, intelligent connection placement program 112 receives a request for a new SR-IOV connection, for example, a TCP connection from a virtual machine, such as VM-A 202 in FIG. 2, to connect with a TCP port in another virtual machine, such as VM-B 204 in FIG. 2.

Intelligent connection placement program 112 determines if an entry exists for the peer in the mapping table (decision block 604). In an embodiment, intelligent connection placement program 112 performs a lookup to the mapping table created in the flow diagram in FIG. 4 above, for example, mapping table 306 in FIG. 3. If intelligent connection placement program 112 determines that an entry exists for the peer in the mapping table ("yes" branch, decision block 604), then intelligent connection placement program 112 proceeds to decision block 606. If intelligent connection placement program 112 determines that an entry does not exist for the peer in the mapping table ("no" branch, decision block 604), then intelligent connection placement program 112 proceeds to step 610 to apply regular LAG load balancing policies.

Intelligent connection placement program 112 determines if a VF exists for the same PF in the mapping table (decision block 606). In an embodiment, intelligent connection placement program 112 performs a lookup to the mapping table created in the flow diagram in FIG. 4 above, for example, mapping table 306 in FIG. 3, to determine if an entry exists for the particular VF in the mapping table. If intelligent connection placement program 112 determines that an entry exists for the particular VF in the mapping table, then an internal connection path exists between the current VF and the peer, and the connection can be made internally using a virtual switch, for example, vSWITCH1 206 from FIG. 2, to make the connection. This avoids the additional latency and possible performance reduction from using an external connection through network 120 of FIG. 1. If intelligent connection placement program 112 determines that an entry exists for the particular VF in the mapping table ("yes" branch, decision block 606), then intelligent connection placement program 112 proceeds to step 608. If intelligent connection placement program 112 determines that an entry does not exist for the particular VF in the mapping table ("no" branch, decision block 606), then intelligent connection placement program 112 proceeds to step 610 to apply regular LAG load balancing policies.

Intelligent connection placement program 112 selects the VF device from the mapping table for the connection (step 608). In an embodiment, intelligent connection placement program 112 selects the appropriate VF device from the mapping table to make the internal connection to the peer, to avoid using an external connection. For example, intelligent connection placement program 112 selects VF0 from FIG. 2 to make the connection, since VF0 can connect to the target, in this example, VM-B 204 in FIG. 2, via virtual switch vSWITCH1 206 from FIG. 2. After the connection is established, intelligent connection placement program 112 ends for this particular connection.

Intelligent connection placement program 112 applies regular LAG load balancing policies to the connection (step 610). At step 610, since intelligent connection placement program 112 has determined that an internal connection does not exist between the two ports, intelligent connection placement program 112 applies regular LAG load balancing policies to the connection. For example, intelligent connection placement program 112 may apply LAG load balancing across the links in a channel by randomly associating a newly learned MAC address with one of the links in the channel. As was described above, this random assignment may force the connection to an external port, making the connection through an external network, such as network 120 from FIG. 1.

Figure 7:
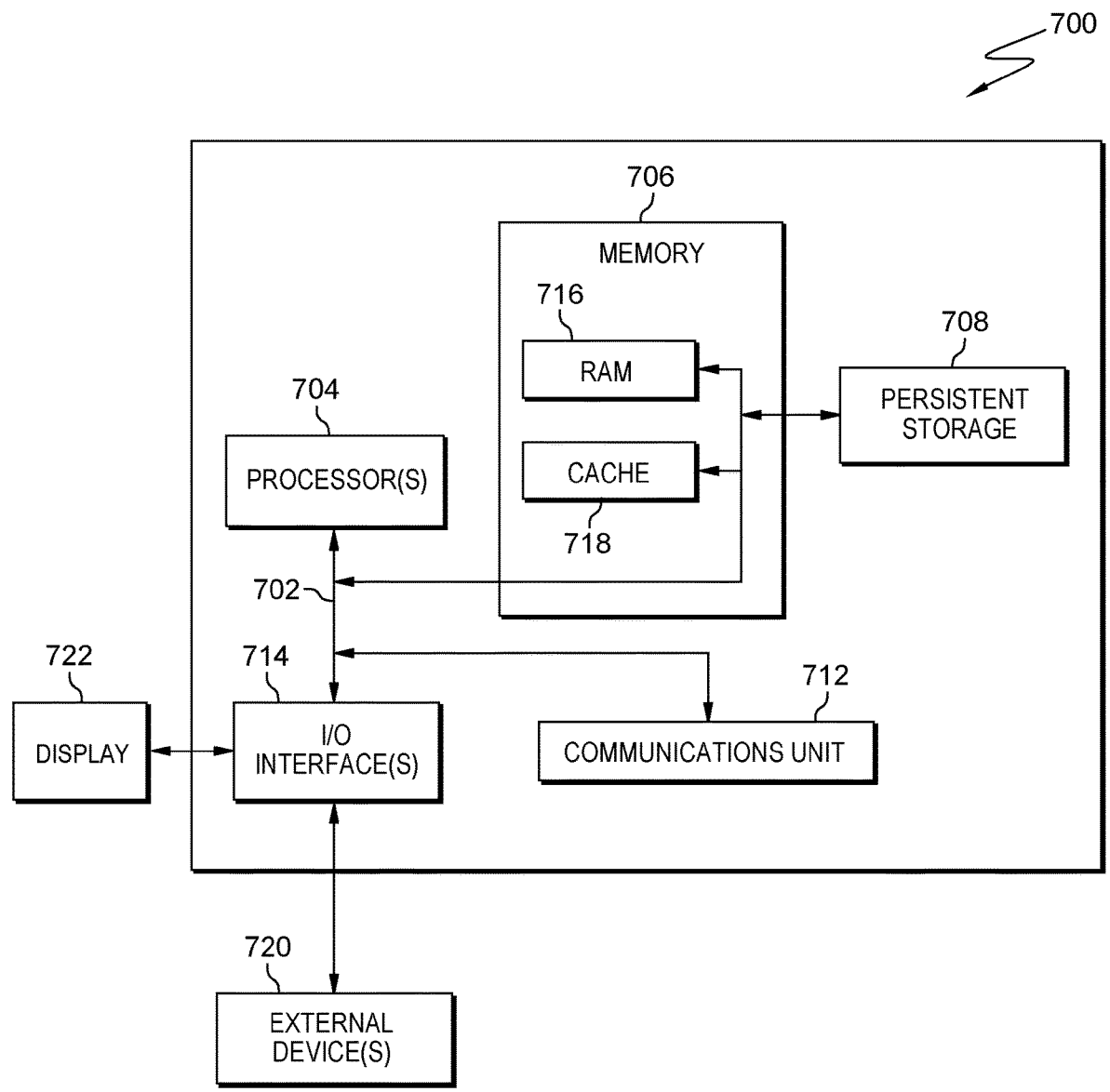
FIG. 7 depicts a block diagram of components of the computing devices executing the intelligent connection placement program within the distributed data processing environment of FIG. 1, in accordance with an embodiment of the present invention.

FIG. 7 is a block diagram depicting components of computing device 110 suitable for intelligent connection placement program 112, in accordance with at least one embodiment of the invention. FIG. 7 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and I/O interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for intelligent connection placement program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., intelligent connection placement program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for intelligent connection placement across multiple logical ports, the computer-implemented method comprising:
    creating a mapping table for a virtual machine;
    responsive to determining that an entry exists in the mapping table for a port on a peer device, determining whether a virtual function exists for the port on the peer device in the mapping table for a physical function; and
    responsive to determining that the virtual function exists for the port on the peer device in the mapping table for the physical function, selecting a virtual function from the mapping table, local to the virtual machine, to connect a local port on the virtual machine to the port on the peer device.

2. The computer-implemented method of claim 1, wherein connecting the local port to the port on the peer device further comprises:
    implementing a virtual switch to bypass the physical function.

3. The computer-implemented method of claim 1, wherein creating the mapping table for the virtual machine further comprises:
    accessing a system device tree, wherein the system device tree contains the virtual function to physical function mapping of one or more local virtual functions.

4. The computer-implemented method of claim 1, wherein the mapping table contains at least a virtual function number, a media access control address, and a physical function number for each entry, and wherein creating the mapping table for the virtual machine further comprises:
    accessing a system address resolution protocol table, wherein the system address resolution protocol table contains the media access control address of one or more remote virtual functions.

5. The computer-implemented method of claim 1, wherein the local port is connected to a network via a link aggregation group.

6. The computer-implemented method of claim 5, wherein the link aggregation group is an EtherChannel.

7. A computer program product for intelligent connection placement across multiple logical ports, the computer program product comprising one or more computer readable storage media and program instructions stored on the one or more computer readable storage media, the program instructions including instructions to:
    creating a mapping table for a virtual machine;
    responsive to determining that an entry exists in the mapping table for a port on a peer device, determining whether a virtual function exists for the port on the peer device in the mapping table for a physical function; and
    responsive to determining that the virtual function exists for the port on the peer device in the mapping table for the physical function, selecting a virtual function from the mapping table, local to the virtual machine, to connect a local port on the virtual machine to the port on the peer device.

8. The computer program product of claim 7, wherein connecting the local port to the port on the peer device further comprises:
    implementing a virtual switch to bypass the physical function.

9. The computer program product of claim 7, wherein creating the mapping table for the virtual machine further comprises:
    accessing a system device tree, wherein the system device tree contains a virtual function to physical function mapping of one or more local virtual functions.

10. The computer program product of claim 7, wherein the mapping table contains at least a virtual function number, a media access control address, and a physical function number for each entry, and wherein creating the mapping table for the virtual machine further comprises:
    accessing a system address resolution protocol table, wherein the system address resolution protocol table contains the media access control address of one or more remote virtual functions.

11. The computer program product of claim 7, wherein the local port is connected to a network via a link aggregation group.

12. The computer program product of claim 11, wherein the link aggregation group is an EtherChannel.

13. A computer system for intelligent connection placement across multiple logical ports, the computer system comprising:
    one or more computer processors;
    one or more computer readable storage media; and
    program instructions stored on the one or more computer readable storage media for execution by at least one of the one or more computer processors, the stored program instructions including instructions to:
    create a mapping table for a virtual machine;
    responsive to determining that an entry exists in the mapping table for a port on a peer device, determine whether a virtual function exists for the port on the peer device in the mapping table for a physical function; and
    responsive to determining that the virtual function exists for the port on the peer device in the mapping table for the physical function, selecting a virtual function from the mapping table, local to the virtual machine, to connect a local port on the virtual machine to the port on the peer device.

14. The computer system of claim 13, wherein connecting the local port to the port on the peer device further comprises:
    implementing a virtual switch to bypass the physical function.

15. The computer system of claim 13, wherein creating the mapping table for the virtual machine further comprises:
    accessing a system device tree, wherein the system device tree contains a virtual function to physical function mapping of one or more local virtual functions.

16. The computer system of claim 13, wherein the mapping table contains at least a virtual function number, a media access control address, and a physical function number for each entry, and wherein creating the mapping table for the virtual machine further comprises:
    accessing a system address resolution protocol table, wherein the system address resolution protocol table contains the media access control address of one or more remote virtual functions.

17. The computer system of claim 13, wherein the local port is connected to a network via a link aggregation group.

* * * * *